Oct. 3, 1950                E. J. SCHWAB                2,524,401
CONCAVE TOOLHOLDER

Filed July 2, 1947                                    2 Sheets-Sheet 1

INVENTOR.
EDWARD J. SCHWAB.
BY
ATTORNEYS.

Oct. 3, 1950          E. J. SCHWAB          2,524,401
CONCAVE TOOLHOLDER
Filed July 2, 1947          2 Sheets-Sheet 2
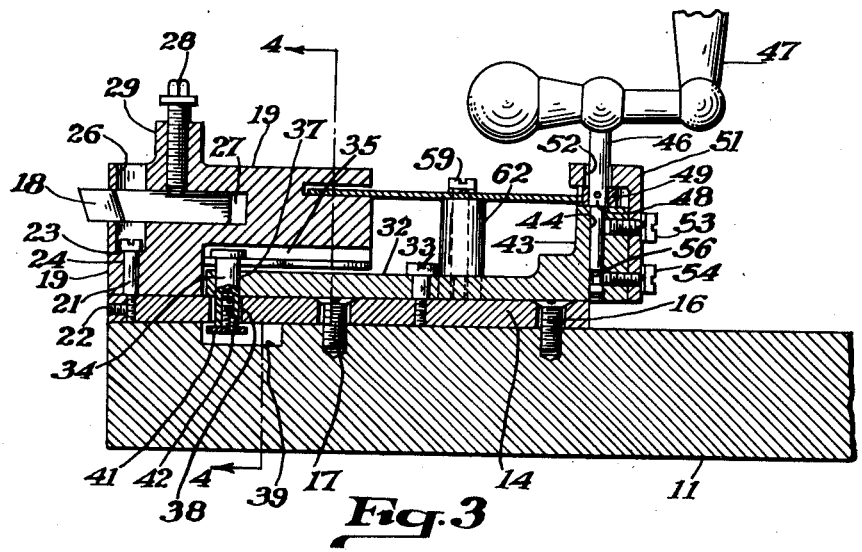
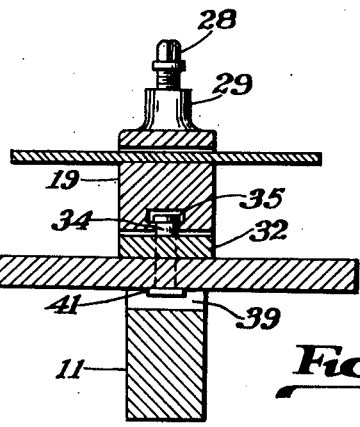
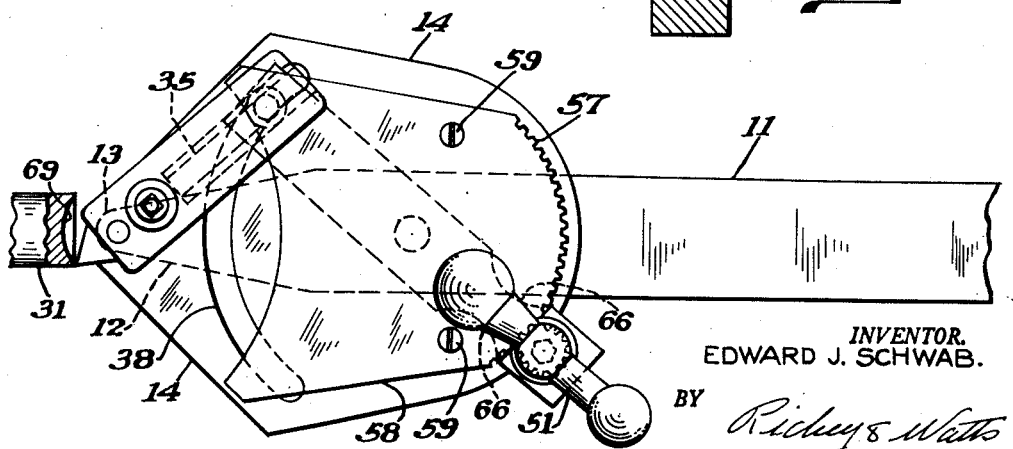
INVENTOR.
EDWARD J. SCHWAB.
BY Richey & Watts
ATTORNEYS.

Patented Oct. 3, 1950

2,524,401

UNITED STATES PATENT OFFICE 2,524,401

CONCAVE TOOLHOLDER

Edward J. Schwab, Lakewood, Ohio

Application July 2, 1947, Serial No. 758,597

4 Claims. (Cl. 82—12)

This invention relates to tool holders for machining concave surfaces in work pieces, the tool holder being adapted for support in the tool post of a lathe or other machine tool, and being constructed for operation in the planes normally occupied by such tools.

The objects of the invention reside in the provision of a tool which is simple of structure and accurate of operation, and which may be readily utilized in machine tools of conventional form.

Other objects and advantages of the invention, more or less ancillary in nature, and the preferred mode of carrying out the invention will be apparent to those skilled in the art from the description herein.

Referring to the drawings:

Fig. 3 is a longitudinal section through the central portion of the tool;

Fig. 4 is a cross section taken on a plane indicated by the line 4—4 in Fig. 3; and Fig. 5 is a plan view of the apparatus in position to start a cut.

Figure 1:
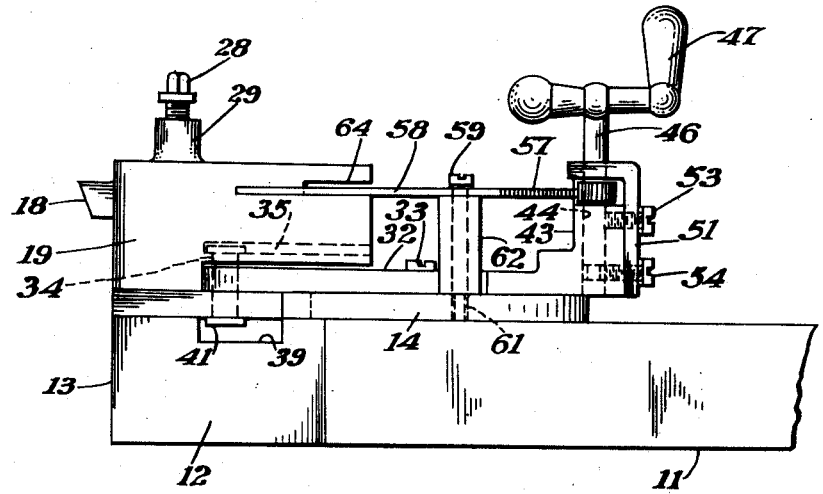
Fig. 1 is a side elevation of the tool holder of the invention.
Figure 2:
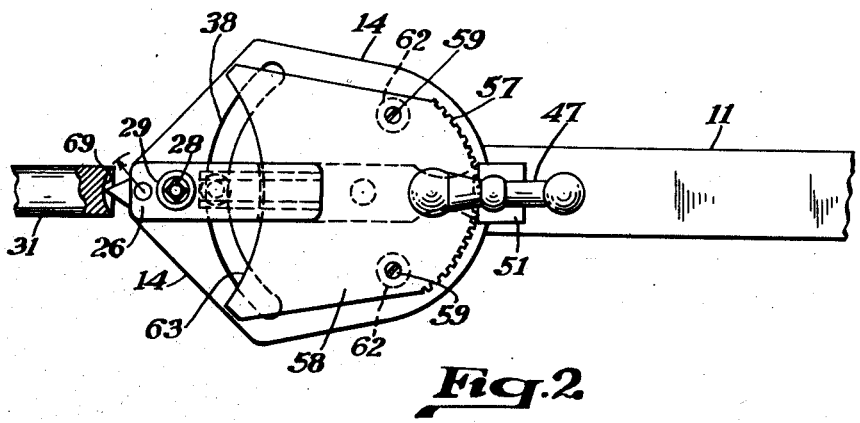
Fig. 2 is a plan view thereof.

The tool holder comprises a shank 11 in the form of a rectangular bar adapted to be secured in a tool post in the usual manner. The forward end 12 of the bar is beveled as illustrated in Figs. 1 and 5, and terminates in a rounded end 13 struck from a relatively small radius. A base plate 14 preferably of the outline shown in Figs. 2 and 5 is secured to the bar 11 by countersunk screws 16 and 17 engaged in tapped openings in the upper face of the bar.

The tool bit 18 is mounted in a block 19 which in turn is mounted for rotation about the vertical axis of a shouldered screw or pivot pin 21 threaded into the forward end of the base plate 14 and secured thereon by a set screw 22. The shoulder of the screw 21 is seated upon the upper surface of the plate 14, and the head of the screw is engaged with the base 23 of a counterbore 26. The body of the screw 21 is disposed in a bore 24 constituting the journal bearing for the block 19. The lower surface of the tool block 19 and the upper surface of the base plate 14 are finished for intimate contact with each other and the cylindrical surface of the screw 21 is machined for snug engagement within the bore 24.

The tool bit 18 is inserted in a square recess 27 in the tool block and is retained by a set screw 28 received in a tapped hole located centrally of a boss 29 in the upper portion of the tool block. By rotating the tool block 19 about the pivot 21, the cutting point of the tool 18 may be caused to describe an arc, the radius of which is determined by the position of the tool. Thus, as illustrated in Figs. 2 and 5, the tool may develop a concave spherical surface when the stock 31 is rotated and the cutter used as an end working tool. The mechanism for rotating the tool block 19 comprises an arm 32 resting on the upper surface of the base plate 14 and pivoted on a shouldered screw 33 received in a tapped hole in the base plate. The arm 32 is coupled to the tool block 19 by a pin 34 formed with a head slidable in a T-slot 35 in the lower face of the tool block. The pin 35 is snugly engaged in a hole 37 in the arm 32, and passes through an arcuate clearance slot 38 in the base plate 14. A groove 39 in the bar 11 is provided to afford clearance for the transverse movement of the pin 34 and the head 41 thereon which comprises a cap screw locked against rotation by a set screw 42 disposed in eccentric relation to the axes of the screw.

The outer end of the arm 32 is formed with a vertical bracket 43 having a bore 44 therein for the reception of a shaft 46 provided with a hand crank 47 on the upper free end thereof. The lower portion of the shaft 46 which is journalled in the bore 44, is of a reduced diameter and defines a shoulder 48 which is engaged with the upper face of the bracket 43. A pinion 49 is pinned to the shaft 46, the lower face thereof bearing upon the top of the bracket 43. Additional bearing for the shaft 46 is provided by an L-shaped bracket 51, which overhangs the pinion 49 and is formed with a bore 52 constituting a journal bearing for the shaft 46. The bracket 51 is secured by cap screws 53 and 54 in tapped holes in the bracket 43. The lower cap screw 54 protrudes slightly into the bore 43 and is engaged with a groove 56 in the shaft 46.

The pinion 46 is intermeshed with gear teeth 57 formed in a plate 58 which is fixed to the base plate 14 by machine screws 59 threaded in tapped holes 61 (Fig. 1) in the plate 14 and supported in spaced relation therewith by hollow cylindrical collars 62. The forward end 63 of the plate 58 is of arcuate form concentric with the pivot 21 of the tool block and is received within a slot 64 in the rear end of the tool block receiving its bearing upon the lower surface of the slot.

The sides of the arm 32 are preferably formed with notches 66 (Fig. 5) to permit maximum movement of the arm without interference with the spacers 62.

In operation, when the hand crank 47 is rotated, the planet pinion 49 will traverse the toothed portion of the fixed plate 58 thus effecting the rotation of the arm 32 about its pivot 33.

Such movement will cause the rotation of the tool block 19 about its fulcrum 21 as the pin 34 in the end of the arm is drawn through the T-slot 35.

The engagement of the plate 58 in the slot 64 of the tool block inhibits any tendency of the tool block to chatter during operation of the mechanism.

In Fig. 5, the cutting tool is shown at the end of its arcuate movement adjacent the circumferential edge of the concavity 69. In Fig. 2, however, the tool is shown in aligned relation with the medial axis of the work.

It will be apparent, of course, that other operations than that illustrated herein may be performed by the tool.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A tool holder comprising a shank adapted for support in the tool post of a machine tool, a tool block adapted to support a tool, means for mounting the tool block pivotally on the shank, means for rotating the tool block, and a plate perpendicular to the axis of rotation of the tool block fixed to the shank frictionally engaging the tool block within a slot in the block to oppose rotation thereof.

2. A tool holder comprising a shank, a tool block pivoted on the shank, a lever pivoted on the shank, a pin projecting from the lever and engaging the tool block, a shaft mounted on the lever, a hand crank and a planet gear fixed to the shaft, and a plate fixed to the shank and formed with sun gear teeth meshing with the planet gear.

3. A tool holder comprising a shank, a tool block pivoted on the shank, a lever pivoted on the shank, a pin projecting from the lever and engaging the tool block, a shaft mounted on the lever, a hand crank and a planet gear fixed to the shaft, and a plate fixed to the shank and formed with sun gear teeth meshing with the planet gear, the plate frictionally engaging the tool block to inhibit motion of the tool block and to inhibit chatter thereof.

4. A tool holder comprising a shank, a tool block pivoted on the shank and formed with a slot perpendicular to the axis of the pivot, a lever pivoted on the shank, a pin projecting from the lever and engaging the tool block, a shaft mounted on the lever, a manual operating means and a planet gear fixed to the shaft, and a plate fixed to the shank and formed with sun gear teeth meshing with the planet gear, the plate frictionally engaging the tool block within the slot to inhibit motion of the tool block and chatter thereof.

EDWARD J. SCHWAB.

REFERENCES CITED

The following references are of record in the file of this patent:

UNITED STATES PATENTS

| Number | Name | Date |
| --- | --- | --- |
| 2,104,238 | Nichols | Jan. 4, 1938 |
| 2,402,070 | Mudica | June 11, 1946 |
| 2,435,212 | Golden | Feb. 3, 1948 |